(12) United States Patent
Morioka

(10) Patent No.: US 9,283,487 B2
(45) Date of Patent: Mar. 15, 2016

(54) SYSTEMS AND METHODS FOR PROCESSING IN GAME HELP REQUESTS DURING A BATTLE

(71) Applicant: DeNA Co., Ltd., Tokyo (JP)

(72) Inventor: Takashi Morioka, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 241 days.

(21) Appl. No.: 14/070,837

(22) Filed: Nov. 4, 2013

(65) Prior Publication Data
US 2014/0128155 A1   May 8, 2014

(30) Foreign Application Priority Data
Nov. 6, 2012  (JP) ................................. 2012-244759

(51) Int. Cl.
| | |
|---|---|
| A63F 9/24 | (2006.01) |
| A63F 13/847 | (2014.01) |
| A63F 13/30 | (2014.01) |
| A63F 13/355 | (2014.01) |
| A63F 13/533 | (2014.01) |
| A63F 13/87 | (2014.01) |
| A63F 13/795 | (2014.01) |
| A63F 13/822 | (2014.01) |
| A63F 13/58 | (2014.01) |
| A63F 13/49 | (2014.01) |
| A63F 13/40 | (2014.01) |

(52) U.S. Cl.
CPC ............... *A63F 13/847* (2014.09); *A63F 13/12* (2013.01); *A63F 13/355* (2014.09); *A63F 13/533* (2014.09); *A63F 13/795* (2014.09); *A63F 13/822* (2014.09); *A63F 13/87* (2014.09); *A63F 13/10* (2013.01); *A63F 13/49* (2014.09); *A63F 13/58* (2014.09); *A63F 2300/556* (2013.01); *A63F 2300/575* (2013.01)

(58) Field of Classification Search
CPC ..... A63F 13/10; A63F 13/12; A63F 2300/556; A63F 2300/5593; A63F 2300/575
See application file for complete search history.

(56) References Cited

U.S. PATENT DOCUMENTS

| | | | |
|---|---|---|---|
| 2012/0157212 A1* | 6/2012 | Kane | A63F 13/10 463/42 |
| 2014/0004955 A1* | 1/2014 | Nahari | A63F 13/10 463/42 |

FOREIGN PATENT DOCUMENTS

JP    2007195702 A    8/2007

OTHER PUBLICATIONS

LOTRO-Wiki.com, "Mailbox", Oct. 13, 2011, <https://lotro-wiki.com/index.php?title=Mailbox&oldid=351017>.*
Wikipedia, "Marvel: Avengers Alliance", Jun. 3, 2012, <https://en.wikipedia.org/w/index.php?title=Marvel:_Avengers_Alliance&oldid=495773225>.*

* cited by examiner

*Primary Examiner* — Justin Myhr
(74) *Attorney, Agent, or Firm* — Procopio, Cory, Hargreaves & Savitch LLP

(57) ABSTRACT

A server device includes a storage unit which stores data of player information including information on the amount of virtual currency possessed by the player in the game and data of a friend player associated with the player; an acceptance processing part which accepts a help request asking for help in the battle from a first player in the battle to another player; an update processing part which, when the help request from the first player is accepted, deducts data of compensation to be paid for making the help request from the data of the player information relevant to the first player and stores/updates the data in the storage unit; and a screen data generation part which generates screen data of a game page including a link which invites the friend player and a second player different from the friend player to participate in the battle to help the first player.

5 Claims, 10 Drawing Sheets

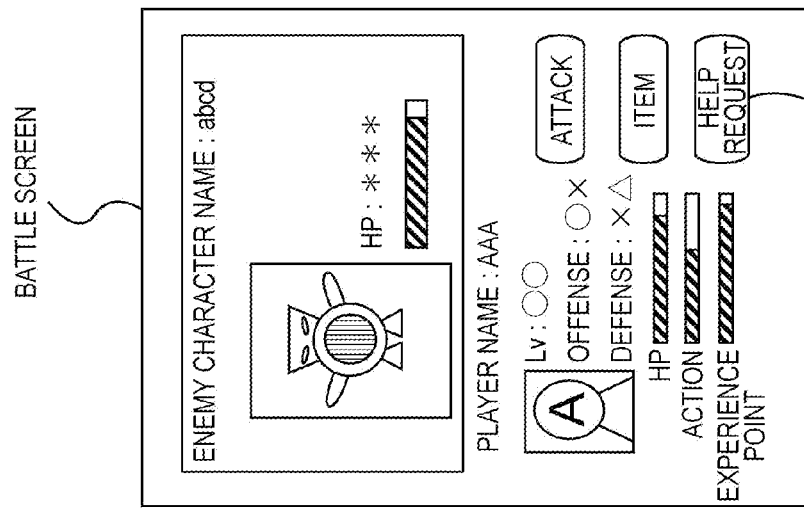
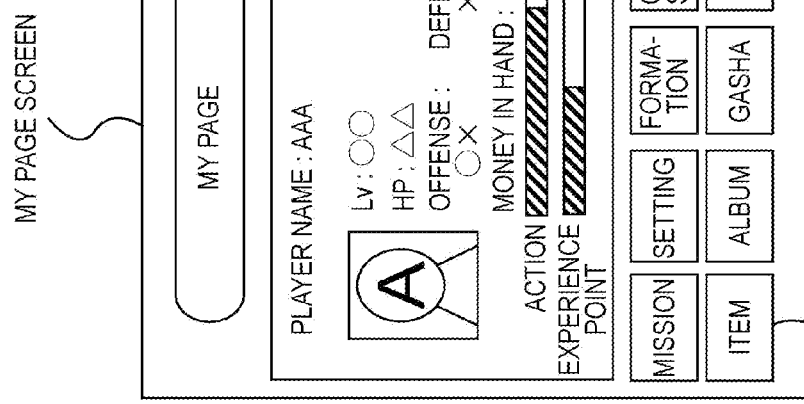
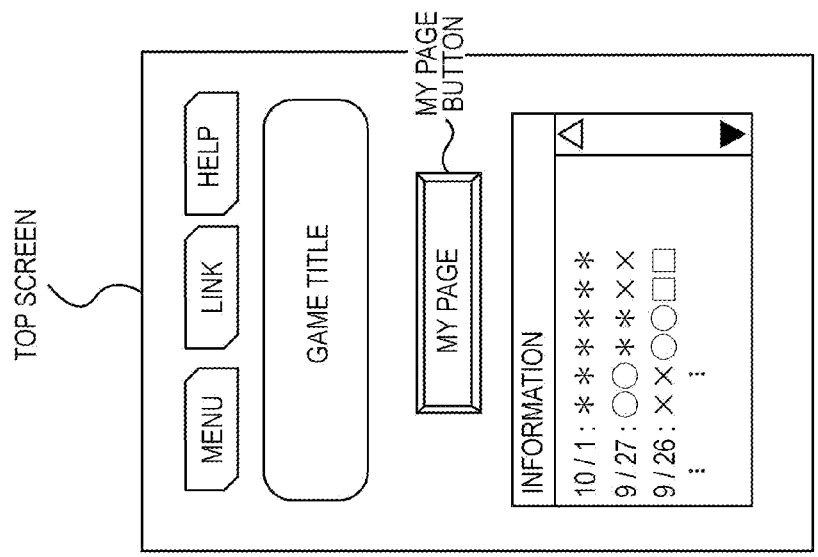

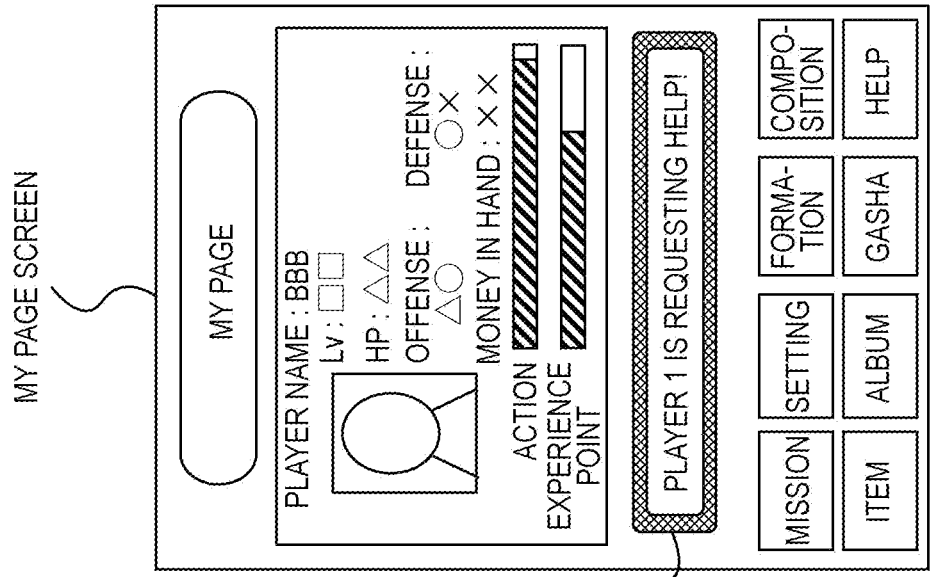
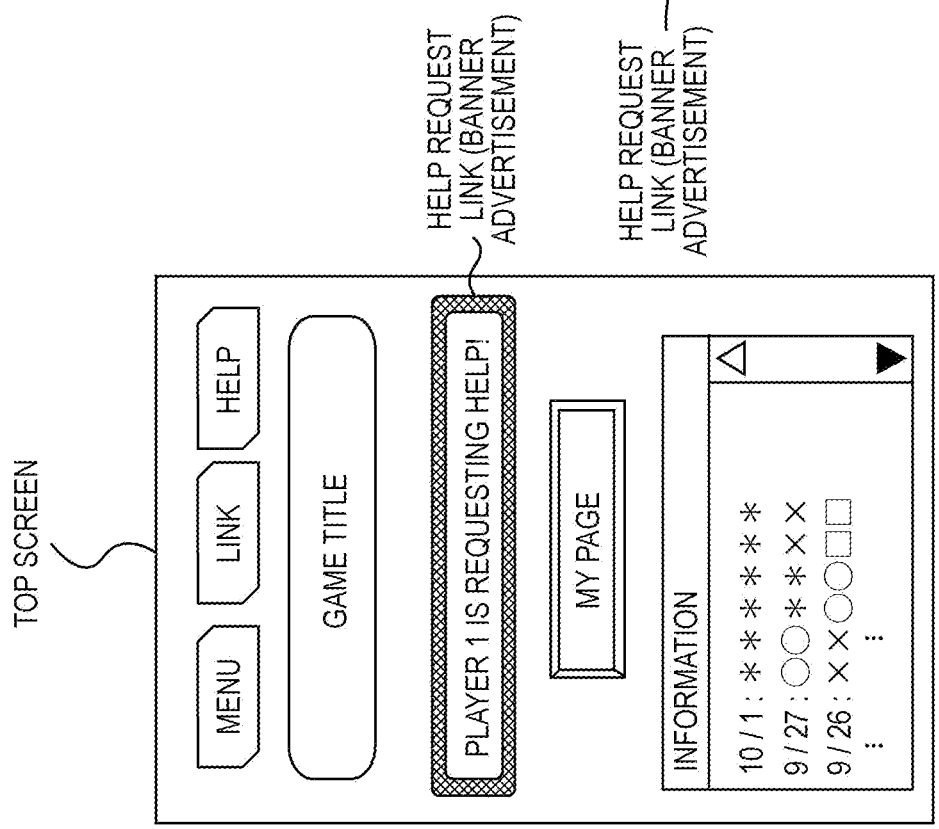

FIG. 10

HELP REQUEST SETTING SCREEN

PLEASE SET HELP REQUEST CONDITION!

(DISPLAY POSITION)

TOP SCREEN : COMPENSATION AMOUNT ○ ×  ○
MY PAGE : COMPENSATION AMOUNT ○ △  ●
BATTLE SCREEN : COMPENSATION AMOUNT × △  ○

(NUMBER OF PLAYERS TO WHOM LINK IS DISPLAYED)

100 PLAYERS : COMPENSATION AMOUNT × ○  ●
1000 PLAYERS : COMPENSATION AMOUNT × △  ○
10000 PLAYERS : COMPENSATION AMOUNT △ ○  ○

(DISPLAY TIME)
︙

TOTAL AMOUNT : ○ × △ □

FINISH SETTING?   | Yes |   |

SYSTEMS AND METHODS FOR PROCESSING IN GAME HELP REQUESTS DURING A BATTLE

CROSS-REFERENCE TO RELATED APPLICATION(S)

This application claims the benefit of Japanese Patent Application No. 2012-244759, filed Nov. 6, 2012, the disclosure of which is hereby incorporated by reference in its entirety.

BACKGROUND OF THE INVENTION

1. Field of the Invention

The present invention relates to a server device and a game program.

2. Description of Related Art

A game in which a player battles an enemy character is widely known. Among games of this kind, there is a game which allows the player to battle the enemy character in cooperation with a peer player. As a method of making a request for cooperation when battling the enemy character in cooperation with the peer player, a player who first encounters the enemy character sends a help request message to the peer player, for example. Another method is to use the character of the peer player as a helper character by paying a predetermined charge (such as JP 2007-195702 A).

SUMMARY OF THE INVENTION

According to the method described in JP 2007-195702 A, one can get cooperation from the peer player (character) and advantageously advance the battle against the enemy character which is otherwise difficult to defeat by oneself.

In this case, however, there has been a problem that one cannot receive enough help when he/she cannot pay the usage charge that increases according to the duration or the number of helper characters used. Another problem has been that there tends to be an increased load on a player who takes time to select which player he/she asks for help when making the help request.

The present invention has been made in consideration of such situations. An object of the present invention is to provide a method by which a player can easily receive enough help from another player while reducing the load on the player in a game of battling an enemy character.

Means for Solving the Problems

The main aspect of the present invention to solve the aforementioned problems is a server device which is connected to a plurality of player terminals through a network and controls a game in which a player battles an enemy character, the server device including: a storage unit which stores data of player information including information on the amount of virtual currency possessed by the player in the game and data of a friend player associated with the player; an acceptance processing part which accepts a help request asking for help in the battle from a first player in the battle to another player; an update processing part which, when the help request from the first player is accepted, deducts data of compensation to be paid for making the help request from the data of the player information relevant to the first player and stores/updates the data in the storage unit; and a screen data generation part which generates screen data of a game page including a link which invites the friend player and a second player different from the friend player to participate in the battle to help the first player. The server device displays the game page on the player terminal operated by the friend player or the second player when the link is accessed by the friend player or the second player. Other features of the present invention will be made clear by the description herein and the attached drawings.

The present invention allows a player to receive enough help from another player more easily while reducing the load on the player in a game of battling an enemy character.

BRIEF DESCRIPTION OF THE DRAWINGS

FIGS. 4A to 4C are a set of diagrams where FIG. 4A illustrates an example of a top screen of a game, FIG. 4B illustrates an example of a my page screen of the game, and FIG. 4C illustrates an example of a battle screen of the game;

FIGS. 7A and 7B are a set of diagrams where FIG. 7A illustrates an example in which a link is displayed on the top screen of the game, and FIG. 7B illustrates an example in which the link is displayed on the my page screen of the game;

FIG. 10 is a diagram illustrating an example of a setting screen displayed in making the help request.

DETAILED DESCRIPTION OF THE INVENTION

Figure 1:
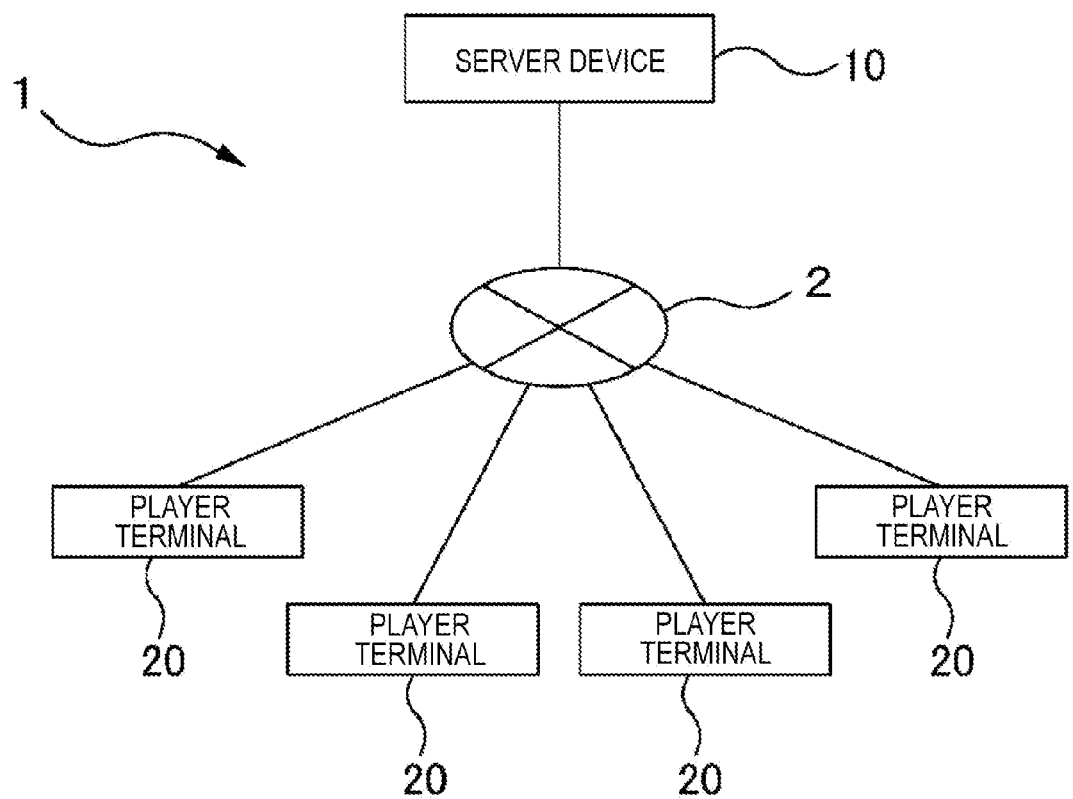
FIG. 1 is a diagram illustrating an example of the overall configuration of a game system 1 according to an embodiment.

At least the following matters will be made clear according to the description herein and the attached drawings.

There is provided a server device which is connected to a plurality of player terminals through a network and controls a game in which a player battles an enemy character, the server device including: a storage unit which stores data of player information including information on the amount of virtual currency possessed by the player in the game and data of a friend player associated with the player; an acceptance processing part which accepts a help request asking for help in the battle from a first player in the battle to another player; an update processing part which, when the help request from the first player is accepted, deducts data of compensation to be paid for making the help request from the data of the player information relevant to the first player and stores/updates the data in the storage unit; and a screen data generation part which generates screen data of a game page including a link which invites the friend player and a second player different from the friend player to participate in the battle to help the first player. The server device displays the game page on the player terminal operated by the friend player or the second player when the link is accessed by the friend player or the second player.

Such server device allows a player to receive enough help from another player more easily while reducing the load on the player in a game of battling an enemy character.

The screen data generation part of the server device may also be adapted to change the number of players to whom the game page including the link inviting the players to participate in the battle is displayed according to the amount of compensation paid for the help request.

According to such server device, the player 1 making the help request can encourage another player to participate in the battle by getting creative with information to be displayed in the help request link and providing more information to the other player.

The server device may also be adapted to change the type of the game page on which the link is displayed according to the amount of compensation paid for the help request.

According to such server device, the player 1 can make the help request in an appropriate manner by considering the amount of virtual currency he/she possesses or how strong the enemy character is, thereby making it easier for the player 1 to receive more appropriate help from the other player.

The acceptance processing part which accepts a request to participate in the battle from the second player and is included in the server device may also be adapted to give a reward to the second player for participating in the battle when the acceptance processing part accepts the request to participate in the battle from the second player through the link.

According to such server device, the player (first player) making the help request receives help from the other player (second player) more easily because one can get a reward by just participating in the battle, which serves as an incentive for a player to participate and help in the battle.

What will also be made clear is a game program which causes an information processing device to execute a game in which a player battles an enemy character, the game program causing the information processing device to execute a process including: a process of storing in a storage unit data of player information including information on the amount of virtual currency possessed by the player in the game and data of a friend player associated with the player; a process of accepting a help request asking for help in the battle from a first player in the battle to another player; a process of deducting data of compensation to be paid for making the help request from the data of the player information relevant to the first player and storing/updating the data after the deduction in the storage unit when the help request from the first player is accepted; a process of generating screen data of a game page including a link which invites the friend player and a second player different from the friend player to participate in the battle to help the first player; and a process of displaying the game page on the player terminal operated by the friend player or the second player when the link is accessed by the friend player or the second player.

First Embodiment

Configuration of Game System

FIG. 1 is a diagram illustrating an example of an overall configuration of a game system 1 according to the present embodiment. The game system 1 provides various services pertaining to a game (such as a social game) to a user (hereinafter also referred to as a "player") through a network 2. The game system 1 includes a server device 10 and a plurality of player terminals 20 each connected to the network 2 to be able to communicate therewith.

A player can play a game transmitted through the network 2 by accessing the game system 1 from the player terminal 20. The player can also communicate amongst a plurality of other players by accessing the game system 1.

<Server Device 10>

The server device 10 is an information processing device used by a system manager or the like in operating and managing a game service.

Figure 2:
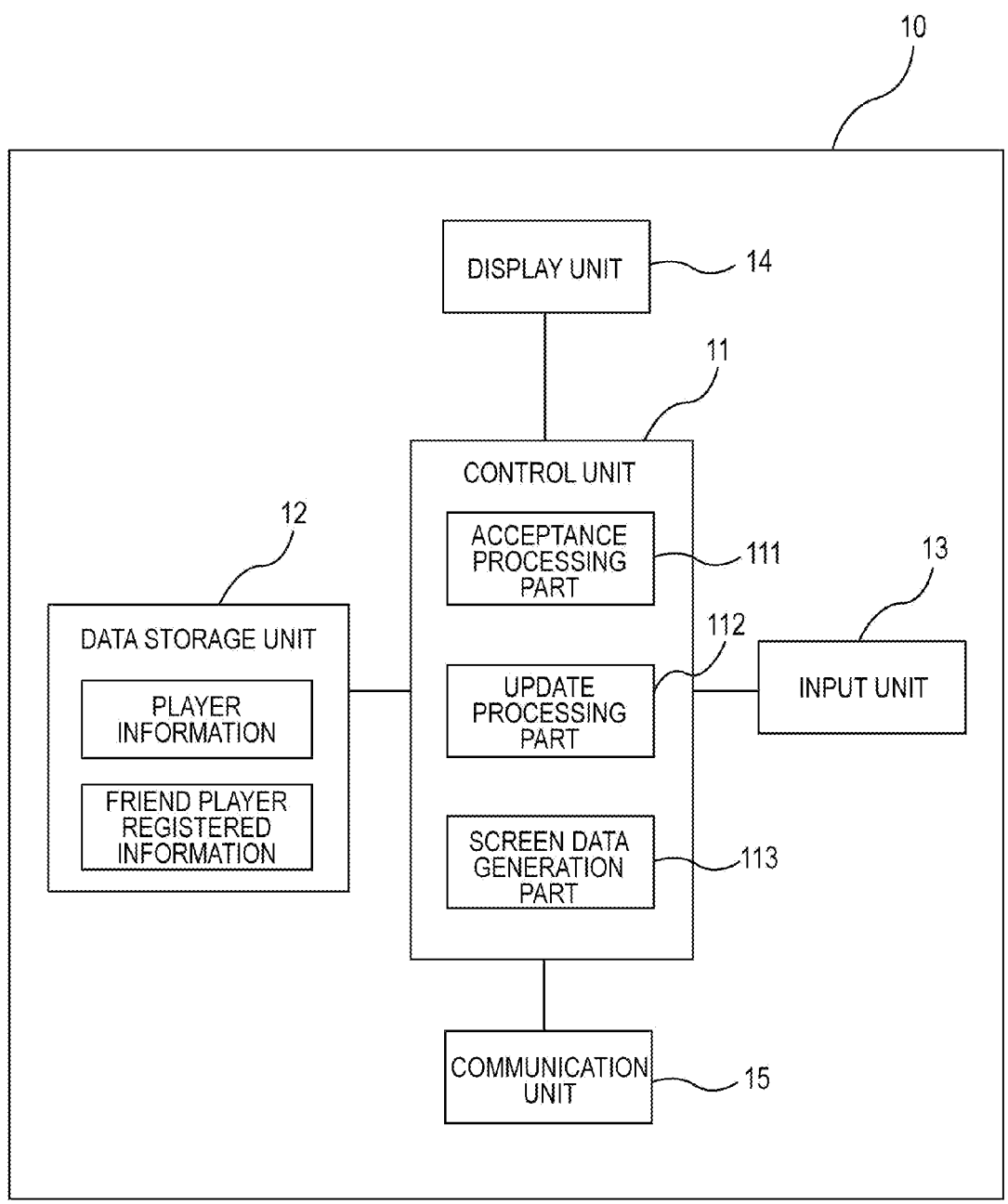
FIG. 2 is a block diagram illustrating a functional configuration of a server device 10 according to an embodiment.

FIG. 2 is a block diagram illustrating a functional configuration of the server device 10. The server device 10 according to the present embodiment includes a control unit 11, a data storage unit 12, an input unit 13, a display unit 14, and a communication unit 15.

The control unit 11 passes data between each part as well as performs overall control on the server device 10. The control unit 11 includes an acceptance processing part 111, an update processing part 112, and a screen data generation part 113 where the specific operation of each part will be described later.

The data storage unit 12 stores player information that is a piece of information pertaining to a player. The player information includes information on money possessed by a player within a game (which is the money circulated within the game and is hereinafter also referred to as a virtual currency). The data storage unit 12 further stores information pertaining to a peer player (hereinafter also referred to as a friend player) registered for each player.

The input unit 13 is provided for the system manager or the like to input the various data or settings related to the game and is realized by a keyboard and a mouse, for example.

The display unit 14 is provided to display a control screen to be operated by the system manager on the basis of a command from the control unit 11 and is realized by a liquid crystal display (LCD), for example.

The communication unit 15 is provided to be able to communicate with the player terminal 20 and has a function as a reception unit which receives various data or a signal transmitted from the player terminal 20 and as a transmission unit which transmits the various data or the signal to the player terminal 20 in accordance with a command from the control unit 11. The communication unit 15 is realized by an NIC (Network Interface Card), for example.

<Player Terminal 20>

The player terminal 20 is an information processing terminal which is operated by a player (user) in playing a game. The player terminal 20 is realized by a mobile phone terminal, a smart phone, a personal computer, a game machine or the like and transmits/receives information to/from the server device 10 which can be accessed through the network 2.

Figure 3:
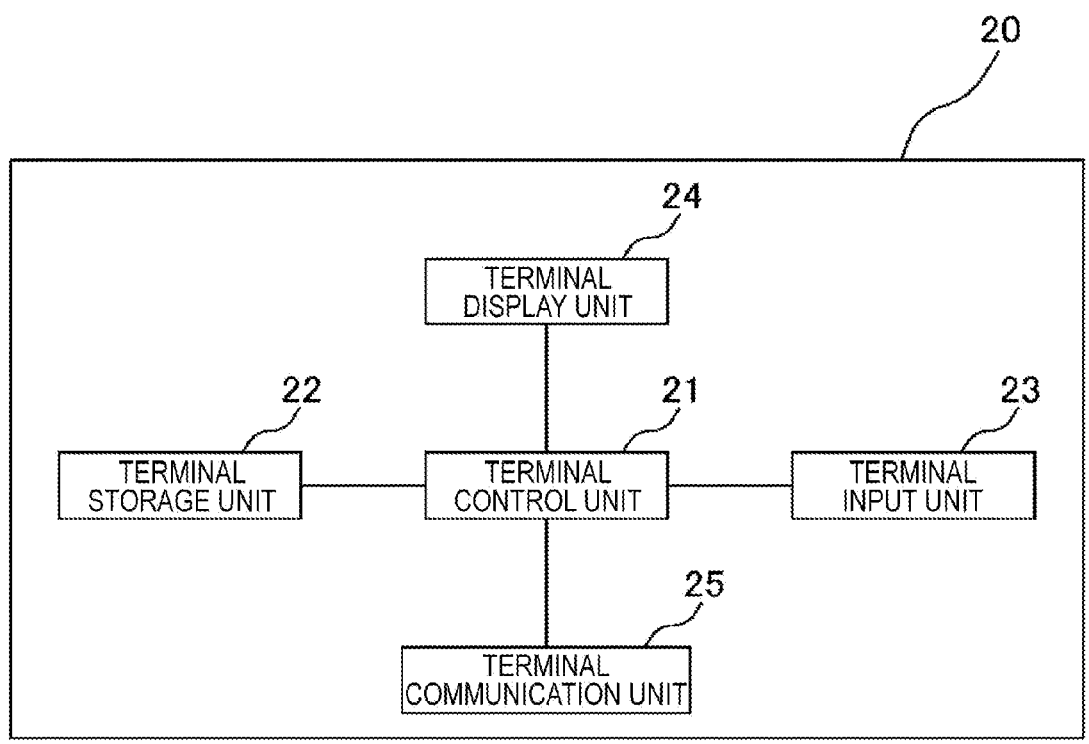
FIG. 3 is a block diagram illustrating a functional configuration of a player terminal 20 according to an embodiment.

FIG. 3 is a block diagram illustrating a functional configuration of the player terminal 20. The player terminal 20 according to the present embodiment includes a terminal control unit 21, a terminal storage unit 22, a terminal input unit 23, a terminal display unit 24, and a terminal communication unit 25.

The terminal control unit 21 passes data between each part and performs overall control on the player terminal 20.

The terminal storage unit 22 is connected to the terminal control unit 21 through a bus and undergoes a process of referring to, reading, or rewriting data stored in the terminal storage unit in accordance with a command from the terminal control unit 21.

The terminal input unit 23 is provided for a player to perform various operations (such as a game operation and a text input operation) and is realized by an operation button or a touch panel, for example.

The terminal display unit 24 is provided to display a game screen (a game page including a link for a help request to be described) generated on the basis of game information by a command from the terminal control unit 21, and is realized by a liquid crystal display (LCD), for example.

The terminal communication unit 25 is provided to be able to communicate with the server device 10 and has a function as a reception unit which receives various data or a signal transmitted from the server device 10 and as a transmission unit which transmits the various data or the signal to the server device 10 in accordance with a command from the terminal control unit 21. The terminal communication unit 25 is realized by the NIC (Network Interface Card), for example.

<<Game Overview>>

An overview of a game provided by the game system 1 will be briefly described.

A game (a social game) provided in the present embodiment advances while a player performs a mission.

The "mission" is an assignment or a duty assigned to the player during the game and is also referred to as a "quest" or a "search" depending on the game. The mission is accomplished when the player performs a plurality of events.

The "event" arises when the mission is in progress and includes an event in which the player earns money (the virtual currency) or an item that can be used within the game or encounters an enemy character and has a battle thereagainst, for example.

Information (a parameter) such as an experience point, a level (LV), a hit point (HP), money in hand, a possessed item, offensive power, defensive power, and an action point are set as the player information for each player, where these parameters change according to the progress of the game. For example, the experience point and the money in hand of the player increase when the player performs and completes a certain event. The level of the player increases when the experience point reaches a fixed value or higher, whereby the offensive power and the defensive power of the player increase so that the player can proceed through the game more easily.

A predetermined amount of action points is consumed when the player performs a certain event in the mission, the predetermined amount of action points being set according to the event. The player cannot perform the event any further when the action point of the player falls below the action point required to perform the event, in which case the player cannot proceed through the mission. Note that the action point is restored as time passes.

The player can advance the game by successively accomplishing the mission assigned one after another.

FIGS. 4A to 4C illustrate an example of various game pages (game screens) generated in the game according to the present embodiment. FIG. 4A is a diagram illustrating an example of a top screen of the game. FIG. 4B is a diagram illustrating an example of a my page screen of the game. FIG. 4C is a diagram illustrating an example of a battle screen of the game.

Once the game is started, the top screen as illustrated in FIG. 4A is first displayed on the terminal display unit 24 of the player terminal 20. The "top screen" is the game page displaying a title of the game and the like and is displayed at the start of the game. In addition to the title of the game, the top screen displays information on the game as well as various buttons to shift to a menu screen, a help screen, and the like. Moreover, the player can move to the my page screen by pressing (touching) a my page button displayed on the top screen.

Although called by a different name depending on the game, the "my page" is the game page displaying information unique to each player and is a basic screen of the game. The my page screen displays a graphic of a player character as well as parameter information (the information on the level and the money in hand described above) of the player character, as illustrated in FIG. 4B. The my page screen further displays a proceeding instruction button by which various instructions to proceed through the game are given. A lower part of the my page screen illustrated in FIG. 4B displays a mission proceeding button, a game setting button, an item button, and a help button, for example. Each player can input an instruction to proceed through the game by pressing these buttons.

A game page provided to proceed with an event is displayed once the event arises in the ongoing mission. That is, the screen shifts to the battle screen as illustrated in FIG. 4C when a battle against an enemy character occurs, for example. The "battle screen" displays a graphic and information such as the HP of the enemy character as well as the parameter information of the player character, for example. Also displayed on the battle screen are an attack button, an item use button, a help request button and the like to proceed with the battle. The help request button is provided to have a battle in a cooperative manner by asking another player for help in the battle.

<Help Request in Battle>

In the game according to the present embodiment, a player can battle a single enemy character in cooperation with a peer player by asking the peer player for help in battling the enemy character. This means that a plurality of players can simultaneously battle the single enemy character. By receiving help from the peer, the player can defeat a strong enemy character (such as a boss character) which is otherwise difficult to defeat by the strength of one player alone. The player also desires to battle a stronger enemy character because the game is set such that the player can earn more virtual currency or a rare and valuable item (a rare item) when the player defeats the strong enemy character as described above.

A player who is actually battling the enemy character makes the help request to a plurality of other players. One method of making the help request is to individually send a help request message to a player one wishes to ask for help through the network 2. However, there has been a case in sending the help request message where the battle is already over at the time the recipient has read the message or where there is a great load on the player because he/she is required to specify the recipient of the message and send the message in a large quantity every time the battle arises.

Another method of making the help request is to ask a friend player who is already registered by displaying a banner advertisement for the help request on the terminal display unit 24 of the player terminal 20 operated by the friend player, for example. There is an increased possibility in employing the banner advertisement that one can get help from a friend player who sees the banner advertisement since the request (help request) itself is displayed on the screen. In this case, however, it has been difficult to get enough help to defeat a strong enemy character since one can make the help request only to the preregistered friend player.

Now, the present embodiment has allowed the help request by means of the banner advertisement to be made to another player in addition to the registered friend player under the condition that the player making the request pays a predetermined compensation. As a result, the player can get enough help more easily with less load in the battle and is more likely to be able to defeat the strong enemy character that is otherwise difficult to defeat alone.

<<Description of Operation>>

A specific process performed in making the help request during the battle will now be described.

Figure 5:
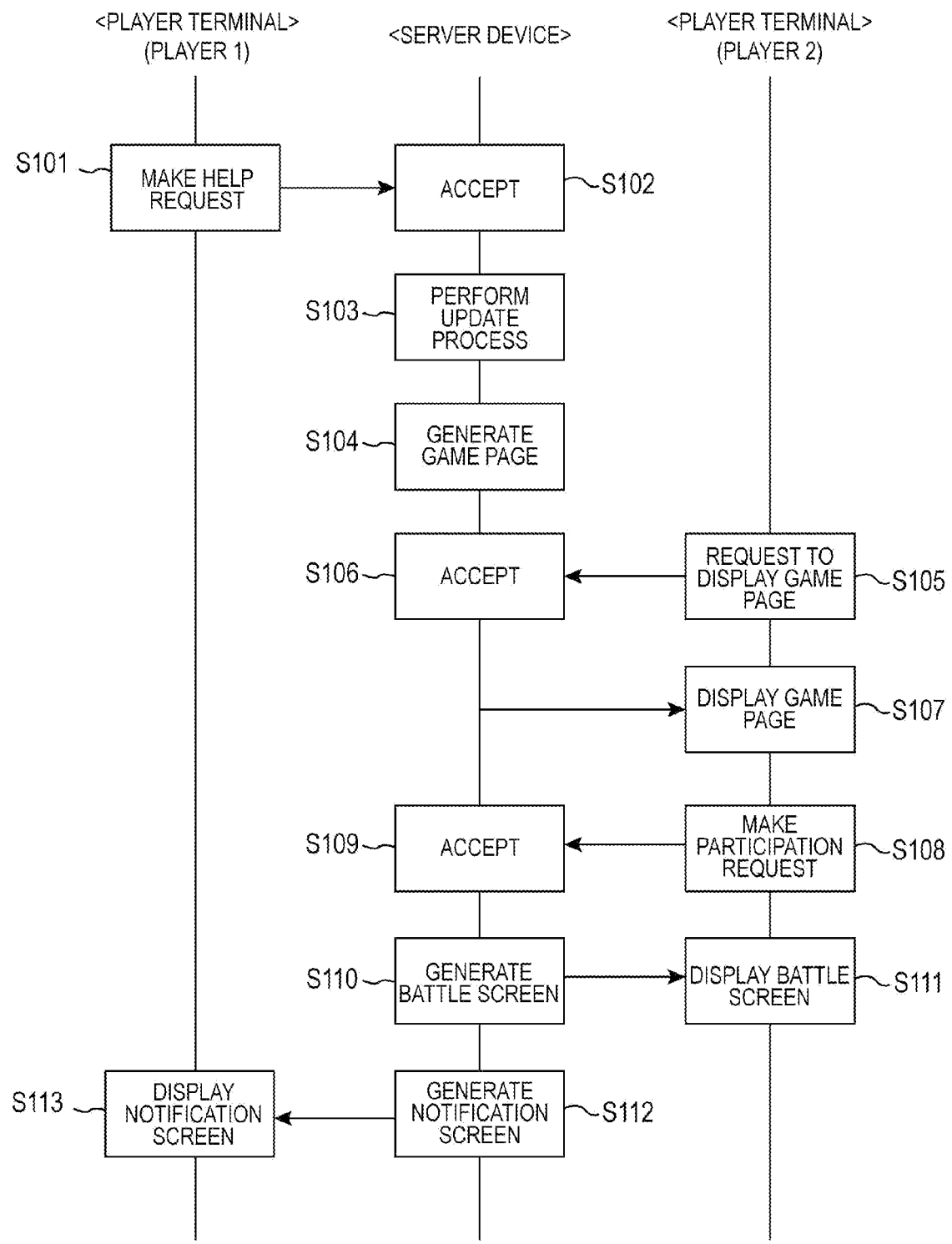
FIG. 5 is a diagram illustrating the flow of a process performed when making a help request in a game according to a first embodiment.

FIG. 5 is a diagram illustrating the flow of a process performed in making the help request in the game according to the present embodiment. The description will be made on the assumption that the battle has already started in the game and that the help request is to be actually made, in order to simplify the description. Moreover, the player making the help request is referred to as a player 1 while a player receiving the help request is referred to as a player 2 in the description.

First, the player (player 1) battling a certain enemy character makes a help request to another player (S101). The help request is made when the player 1 presses the help request button (refer to FIG. 4C) within the battle screen displayed on the terminal display unit 24. The help request in the game according to the present embodiment is made provided that the player pays compensation for the help request. Accordingly, the screen data generation part 113 may generate a screen (not shown) on which the player 1 making the help request confirms the amount of compensation to be paid and which is displayed in the player terminal 20 operated by the player 1.

The help request made by the player 1 is transmitted to the server device 10 through the network 2 and accepted by the acceptance processing part 111 (S102).

The update processing part 112 of the server device 10 then deducts the amount of compensation to be paid for making the help request from the amount of the virtual currency (money in hand) possessed by the player 1 and performs an updating process in which the data stored in the data storage unit 12 is updated (S103).

Figure 6:
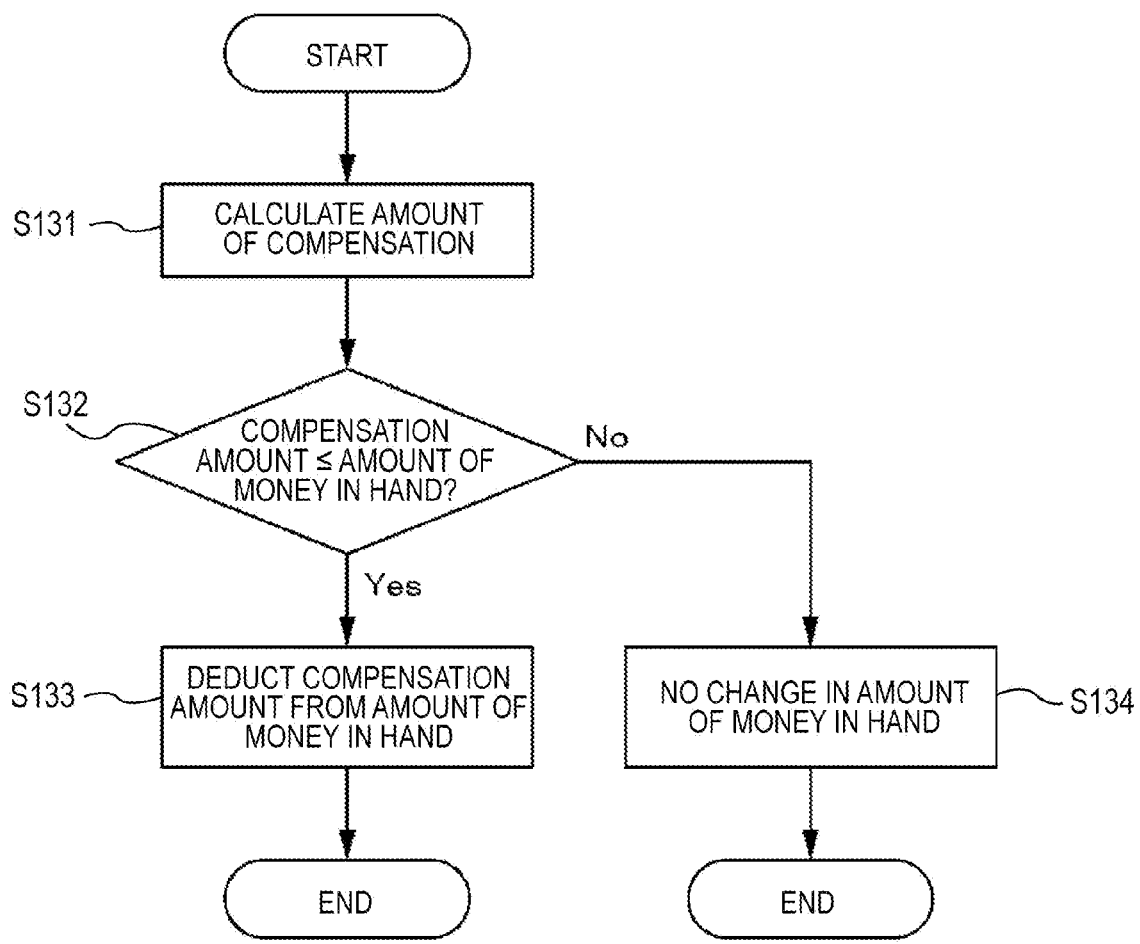
FIG. 6 is a diagram illustrating the flow of an updating process.

FIG. 6 is a diagram illustrating the flow of the updating process. The update processing part 112 first calculates the amount of compensation to be paid for the help request accepted (S131). That is, the update processing part determines the amount of the compensation to be paid for the help request. Note that the description will be provided assuming the compensation for the help request is paid by the virtual currency. While it is also assumed that the amount of the compensation (amount of the virtual currency) to be paid for the help request is set in advance, the compensation may vary in amount according to the range or method of the help request.

The update processing part 112 thereafter refers to the information on the money in hand among the player information of the player (player 1) having made the help request and compares the amount of money in hand with the amount of compensation calculated in S131 (S132). Accordingly, the help request is considered to be officially accepted when the amount of the virtual currency (money in hand) possessed by the player 1 is greater than or equal to the amount of the compensation to be paid for the help request (Yes in S132), whereby the update processing part stores in the data storage unit 12 the data after the amount of the compensation is deducted from the amount of the virtual currency possessed by the player 1 and updates the data (S133). On the other hand, the help request is considered to be rejected when the amount of the virtual currency possessed by the player 1 is less than the amount of the compensation to be paid for the help request (No in S132), whereby the amount of the virtual currency (money in hand) possessed by the player 1 does not change (S134).

Note that when the help request is rejected in the process performed in S103, the screen data generation part 113 generates data of a game screen (not shown) including a message that the help request cannot be made. The generated data of the game screen is transmitted through the network 2 to the player terminal 20 operated by the player (player 1) having made the help request and displayed on the terminal display unit 24.

Once the help request is accepted and the amount of compensation is deducted from the amount of money in hand of the player 1, the screen data generation part 113 generates screen data of a game page including a link (hereinafter also referred to as a help request link) to participate in the battle currently fought by the help requestor (player 1) (S104). The link to participate in the battle is displayed in any of the game pages such as the top screen or the my page screen of the game described above.

FIG. 7A is a diagram illustrating an example where the help request link is displayed on the top screen of the game, while FIG. 7B is a diagram illustrating an example where the help request link is displayed on the my page screen of the game. As illustrated in FIGS. 7A and 7B, the link (the help request link) to participate in the battle is displayed at a position easily recognized (noticeable) on each screen. The help request link is displayed as a banner advertisement button as illustrated in the figure while displaying message information such as "Player 1 is requesting help!". Note that the information displayed in the link can be changed in accordance with the request from the player 1 making the help request. For example, the link may display the state of the enemy character in the battle (such as the power or the HP remaining of the enemy character) or the reward given when one defeats the enemy character. The display position or the display time of the help request link may also be changed according to the request from the player 1. The player 1 can encourage another player to participate in the battle by being creative with the information displayed in the help request link and providing more information on the battle to the other player.

When the other player (let it be the player 2 in this case) other than the player 1 has made a request to display a predetermined game page (such as the top screen or the my page screen described above) on the player terminal 20 (S105), the request is accepted by the acceptance processing part 111 of the server device 10 (S106) so that the screen of the game page requested by the player 2 is displayed on the terminal display unit 24 of the player 2 (S107). The aforementioned help request link is displayed in the game page (refer to FIGS. 7A and 7B).

In other words, the game page including the help request link is displayed on the terminal display unit 24 of the player terminal 20 operated by the player 2 when the player 2 has accessed the server device 10.

Note that the screen data of the game page including the help request link is transmitted to all players (players receiving the help request) except the player 1 making the help request. That is, the screen data including the help request link is transmitted to the player terminal 20 operated by a player registered as the friend player of the player 1 and by all the other players. The player 1 can therefore proceed through the battle efficiently by obtaining the chance to receive help from a number of players in addition to the friend player.

Here, a predetermined number of players may be set to receive the help request where, for example, the screen data including the help request link is transmitted to a hundred players arbitrarily selected from among all the players except the player 1 and the friend player thereof.

The player 2 having noticed the help request link displayed on the screen of the game page can make the request to participate in the battle against the enemy character currently fought by the player 1 by pressing the help request link (the banner advertisement button) displayed in the game page (S108). Note that the help request link (the banner advertisement) displayed on the player terminal 20 operated by the player 2 is deleted when the battle fought by the player 1 is over, whereby a normal game page screen (refer to FIGS. 4A to 4C) is generated by the screen data generation part 113 and displayed anew. This means the player 2 cannot make the request to participate in the battle after the battle event is over.

The request from the player 2 to participate in the battle is transmitted to the server device 10 through the network 2 and accepted by the acceptance processing part 111 (S109). The screen data generation part 113 then generates screen data of the battle against the same enemy character as that the player 1 is currently battling (S110). The generated data of the battle screen is transmitted to the player terminal 20 operated by the player 2 and displayed on the terminal display unit 24 (S111). As a result, the player 2 can battle the same enemy character as that the player 1 is currently battling. In other words, the player 1 can get help from the player 2 in the battle currently fought by the player 1.

The screen data generation part 113 further generates notification screen data (not shown) to notify the player 1 that the player 2 has participated in the battle (S112). The generated notification screen data is transmitted to the player terminal 20 operated by the player 1 and displayed on the terminal display unit 24 (S113). The player 1 can therefore confirm that the player 2 has participated in the battle in response to the help request.

The player 1 in the game according to the present embodiment can make the help request to a number of players provided that the player 1 pays the compensation. That is, the player 1 can efficiently get help from the other player with less load. As a result, there is an increased possibility that the player can win the battle against the enemy character when the player 1 and the other player (the player 2 in the example above) cooperatively battle the single enemy character, thereby making it easier for the player to earn the reward for defeating the enemy character. The more players one gets help from, the higher possibility there is of winning the battle against the enemy character.

<<Variation>>

In order to encourage the player having received the help request to participate and offer help in the battle, a reward may be given to the player (player 2) who has participated in the battle in response to the help request.

Figure 8:
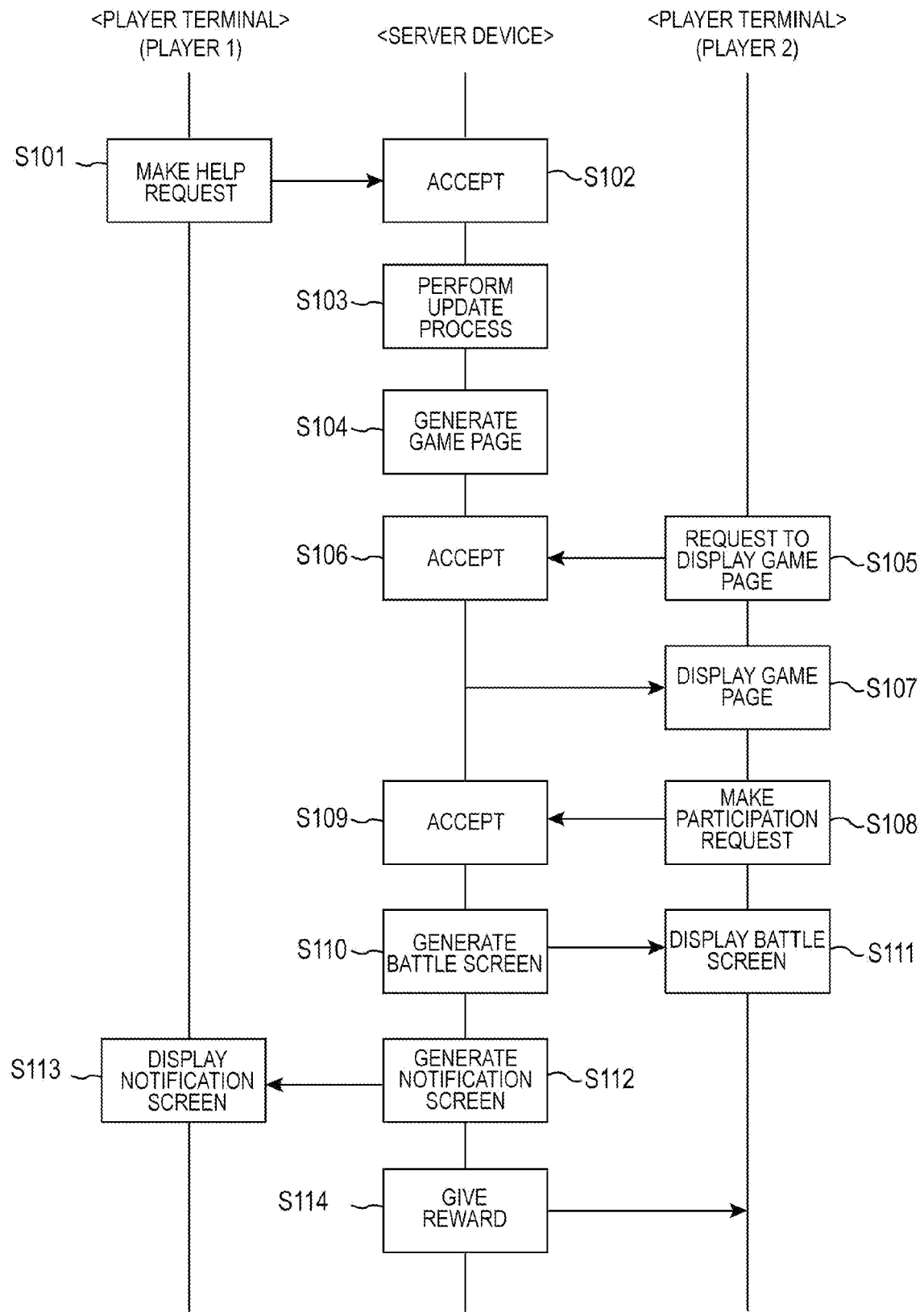
FIG. 8 is a diagram illustrating a variation of the flow of the process performed when making the help request in the game according to an embodiment.

FIG. 8 is a diagram illustrating a variation of the flow of the process performed when making the help request in the game according to the present embodiment. Each process performed in S101 to S113 is similar to that performed in the aforementioned case. When the server device 10 has accepted the request from the player 2 to participate and offer help in the battle through the help request link in the variation, the update processing part 112 performs a process to give a predetermined reward to the player 2 having made the participation request (S114). For example, the update processing part updates the player information pertaining to the player 2 by adding a predetermined amount of virtual currency as a participation reward to the amount of virtual currency possessed by the player 2 or giving a predetermined item to the player 2 at the stage the server device 10 has accepted the request to participate and offer help from the player 2, and stores the updated information in the data storage unit 12.

The player 2 can thus earn the reward by just participating in the battle. The reward serves as the incentive for the other player (player 2) to participate and offer help in the battle, thereby making it easier for the player 1 to get help from the other player.

The player 1 may pay the reward as well such that, for example, the player 1 sets the reward at the time of making the help request and pays the predetermined reward to the player (player 2) who has actually responded to the help request, the predetermined reward being paid from the money in hand or the item of the player 1. The player 1 can get help from the other player more easily by appropriately setting the reward according to the power of the enemy character or a state of the battle.

Second Embodiment

A second embodiment will describe an example of changing a display mode or the like of a help request link according to the amount of compensation paid by a player making a help request.

Figure 9:
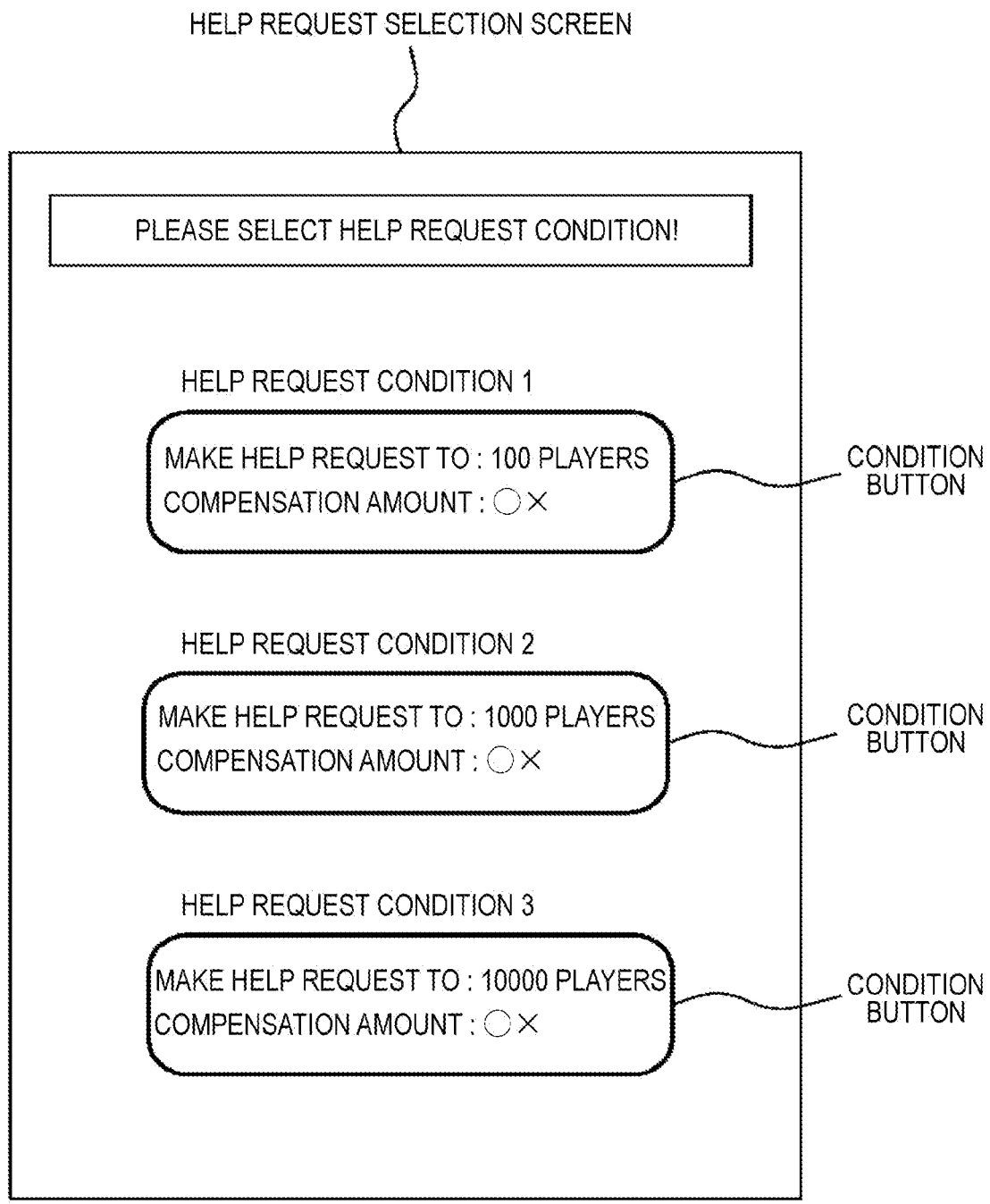
FIG. 9 is a diagram illustrating an example of a selection screen displayed in making the help request.

In the second embodiment, the player (a player 1) making the help request can select a condition of the help request and the amount of compensation in the stage of making the help request (S101 in FIG. 5). FIG. 9 is a diagram illustrating an example of a selection screen displayed when making the help request.

The selection screen as illustrated in FIG. 9 is displayed when the player 1 fighting a battle presses a help request button (refer to FIG. 4C). The selection screen displays a plurality of condition buttons on which a condition of displaying the help request link and the amount of compensation to be paid in order to display the help link are stated. The player 1 can make the help request to another player under a desired condition by selecting and pressing one of the plurality of condition buttons. In the example illustrated in FIG. 9, each condition is set such that the number of players to which the help request link is displayed varies with the amount of compensation where the larger the amount of compensation, the more players one can make the help request to. There is a higher possibility of getting help when making the help request to ten thousand players than to a hundred players, for example. Now, the player 1 is allowed to select the condition in making the help request so that the player (player 1) making the help request can get appropriate help more easily by considering the amount of virtual currency the player 1 possesses or the power of the enemy character. Note that the condition of the help request changes in accordance with the amount of compensation where the condition is not limited to the number of players receiving the request but may be another condition.

The player 1 may also be able to set the condition of the help request for himself/herself. FIG. 10 is a diagram illustrating an example of a setting screen displayed when making the help request. One can select on the setting screen a display position of the help request link, a range of display, a display time, and content of a message, for example.

One can specify the type of a game page on which the help request link is displayed in the setting of the display position of the help request link. That is, one can specify the game page such as a top screen (refer to FIG. 7A) or a my page screen (refer to FIG. 7B) on which the help request link is displayed according to the amount of compensation. Displaying the link on the top screen of the game brings very high advertising effect because the top screen is the screen all players playing the game visit at the start of the game and frequently catches the eye of the players. On the other hand, the help request link itself displayed on a battle screen or an event screen is possibly overlooked. The player 1 can therefore get appropriate help more easily by specifying the screen on which the link is displayed according to the amount of compensation.

Alternatively, one may be able to specify the display position of the help request link (a banner advertisement) within the game page screen displayed on a player terminal 20 of a player 2 receiving the help request. One can expect a higher advertising effect when the help request link is displayed in the center of the screen than on the edge of the screen, for example, since the link is more noticeable when displayed in the center of the screen. Accordingly, the amount of compensation is set higher as the link is to be displayed closer to the center of the screen. As described above, the player 1 himself/herself can select and set the desired display position by setting the amount of compensation for each display position on which the help request link is to be displayed.

The number of players to whom the help request is transmitted can be set in the setting of the number of players to whom the help request link is to be displayed. In this case, the amount of compensation is set higher as the number of players to whom the help request is transmitted increases. Moreover, the duration for which the help request link is displayed on the game page screen of the player receiving the help request can be set in the setting of the display time of the help request link. In this case, the time for which the help request link is displayed is set longer as the amount of compensation increases. Furthermore, the player transmitting the help request can freely edit the message displayed in the help request link in accordance with the amount of compensation, in the setting of the content of the message in the help request link. In this case, the message can be set to be displayed in a larger character or a longer sentence as the amount of compensation increases. In addition, a level (LV) of the player to whom the help request is transmitted or another condition may be set in accordance with the amount of compensation.

The help request is made when these conditions are combined and the help request condition is approved in the end by the player 1 making the help request. As a result, the player 1 can earn the chance to get more help in accordance with the amount of compensation by setting the help request condition according to the determination made by the player 1 himself/herself.

Another Embodiment

The aforementioned embodiments have been described to facilitate the understanding of the present invention, not to interpret the present invention in a limited manner. Needless to say, the present invention can be modified, improved, and include equivalents thereof without departing from the spirit of the present invention. An embodiment described below is also included in the present invention.

<Compensation for Help Request>

While the virtual currency possessed by the player making the help request in the game is used as the compensation to be paid in making the help request in the aforementioned embodiments, the item possessed by the player or the aforementioned action point among the player information may be consumed instead as the compensation for the help request, for example. Moreover, an item provided exclusively for making the help request may be provided so that a player possessing the exclusive item may advantageously perform the help request. The range of help request (such as the display position or the number of players to whom one makes a request) may be changed according to the number of exclusive items used, for example.

<Payment of Compensation>

In the aforementioned embodiments, the help requestor (player 1) is allowed to make the help request provided that the player 1 pays the amount of compensation corresponding to the help request. That is, the player 1 has paid the compensation prior to making the help request. On the other hand, the player 1 may pay the compensation after having made the help request where, for example, the player 1 pays the compensation after the battle in accordance with a pay-for-use method in which the amount of compensation changes with the display time or the like of the help request link. There may also be adopted a method in which the amount of compensation changes with the actual number of players who have participated in the battle in response to the help request.

<Game Medium>

While there has been described the example where the player proceeds through the battle against the enemy character according to the parameters such as the offensive power, the defensive power and the HP set as the player information in the aforementioned embodiments, the battle may also be fought by using a predetermined game medium. When a plurality of types of cards in which the parameters such as the offensive power and the defensive power are set is used as the game medium, for example, the player may construct a deck by combining predetermined cards from among the cards possessed by each player and battle the enemy character or the like by using the deck.

<Information Processing Device>

While there has been described the example where the game system 1 includes one server device 10 as an example of the information processing device in the aforementioned embodiments, the game system 1 may also include a plurality of the server devices 10 as the information processing devices. That is, the plurality of server devices 10 may be connected through the network 2 so that each server device 10 performs the various processes in a distributed manner.

Moreover, the player terminal 20 may take up a part of the function as the information processing device, in which case the server device 10 and the player terminal 20 constitute the information processing device.

<Game Program>

While there has been described the example where the player in the battle can easily and efficiently get help from another player by the collaboration of the server device 10 and the player terminal 20 in the game system 1 according to the aforementioned embodiments, the present invention also includes a game program provided to execute these processes. That is, the server device 10 and the player terminal 20 serving as the information processing device may execute each of the aforementioned processes on the basis of the game program.

What is claimed is:

1. A server device which is connected to a plurality of player terminals through a network and controls a game in which a player battles an enemy character, the server device comprising:
   a memory that stores data of player information including information on an amount of virtual currency possessed by the player in the game and data of a friend player associated with the player; and
   a processor, configured to:
   accept a help request asking for help in the battle from a first player in the battle, the help request sent to a number of players, the number of players determined based on an amount compensation paid for the help request, the number of players comprising a friend player and a second player selected arbitrarily by the server device that is different from the friend player;

when the help request from the first player is accepted by another player, deduct data of compensation to be paid for making the help request from the data of the player information relevant to the first player and stores/updates the data in the memory; and generate screen data of a game page including a link which invites each player in the number of players to participate in the battle to help the first player, wherein the game page is displayed on the player terminal operated by the friend player or the second player when the link is accessed by the friend player or the second player.

2. The server device according to claim 1, wherein the processor is configured to change the number of the players to whom the game page including the link inviting the players to participate in the battle is displayed according to an amount of the compensation paid for the help request.

3. The server device according to claim 1, wherein the processor is configured to change a type of the game page on which the link is displayed according to the amount of the compensation paid for the help request.

4. The server device according to claim 1, wherein the processor is configured to accept a request to participate in the battle from the second player, and gives a reward to the second player for participating in the battle when having accepted the request to participate in the battle from the second player through the link.

5. A non-transitory computer-readable storage medium storing a game program which causes an information processing device to execute a game in which a player battles an enemy character, the non-transitory computer-readable storage medium storing a game program causing the information processing device to execute a process comprising:

a process of storing in a storage unit data of player information including information on an amount of virtual currency possessed by the player in the game and data of a friend player associated with the player;

a process of accepting a help request asking for help in the battle from a first player in the battle, the help request sent to a number of players, the number of players determined based on an amount compensation paid for the help request, the number of players comprising a friend player and a second player selected arbitrarily by the game program that is different from the friend player;

a process of deducting data of compensation to be paid for making the help request from the data of the player information relevant to the first player and storing/updating the data after the deduction in the storage unit when the help request from the first player is accepted by another player;

a process of generating screen data of a game page including a link which invites each player in the number of players to participate in the battle to help the first player; and a process of displaying the game page on the player terminal operated by the friend player or the second player when the link is accessed by the friend player or the second player.

* * * * *